US010330487B1

(12) United States Patent
Oberweis et al.

(10) Patent No.: US 10,330,487 B1
(45) Date of Patent: *Jun. 25, 2019

(54) ENHANCED GEOCODING

(71) Applicant: The Oberweis Group, Inc., North Aurora, IL (US)

(72) Inventors: Joseph S. Oberweis, Sugar Grove, IL (US); Akash Takyar, New Delhi (IN); Shaifali Garg, New Delhi (IN)

(73) Assignee: The Oberweis Group, Inc., North Aurora, IL (US)

( * ) Notice: Subject to any disclaimer, the term of this patent is extended or adjusted under 35 U.S.C. 154(b) by 28 days.

This patent is subject to a terminal disclaimer.

(21) Appl. No.: 15/822,085

(22) Filed: Nov. 24, 2017

Related U.S. Application Data

(63) Continuation of application No. 14/635,592, filed on Mar. 2, 2015, now abandoned, which is a continuation of application No. 14/027,498, filed on Sep. 16, 2013, now Pat. No. 8,972,167, which is a continuation of application No. 13/083,136, filed on Apr. 8, 2011, now Pat. No. 8,538,679.

(51) Int. Cl.
*G01C 21/36* (2006.01)

(52) U.S. Cl.
CPC .................. *G01C 21/36* (2013.01)

(58) Field of Classification Search
CPC combination set(s) only.
See application file for complete search history.

(56) References Cited

U.S. PATENT DOCUMENTS

| 5,191,522 A | 3/1993 | Bosco et al. |
| 6,067,525 A | 5/2000 | Johnson et al. |

(Continued)

OTHER PUBLICATIONS

City of Newport Beach, registration, general information, and FAQ for residents and solictors regarding "Do Not Solicit" Registry, Archive date of May 27, 2010, http://web.archive.org/web/20100527094056/http://www.newportbeachca.gov/index.aspx?page=1518.

(Continued)

*Primary Examiner* — Redhwan K Mawari

(74) *Attorney, Agent, or Firm* — Banner & Witcoff, Ltd.

(57) ABSTRACT

An enhanced geocoding module may be used to determine various physical addresses located on the same street. The enhanced geocoding module may create a grid around a predetermined location and request the physical addresses of various coordinate points located on the grid. Additional features of the module may include a display that displays the grid with physical addresses located on the same street, various statistics related to a user of the enhanced geocoding module, and a color-coded scheme that indicates the status of individuals/groups located at the physical addresses. Furthermore, an enhanced disposition monitoring module may be provided in a plurality of computing devices (e.g., a handheld computing device, a remote server, etc.) to receive, transmit, maintain, and/or analyze disposition and related information that may be associated with geocoded information (e.g., a street address). The enhanced disposition monitoring module may generate a report based on the analysis of the information, including for example, reports showing performance of salespeople and sales in particular neighborhoods. Moreover, the collected information may be analyzed and the resulting data models may be licensed to third-party entities.

20 Claims, 9 Drawing Sheets

(56) References Cited

U.S. PATENT DOCUMENTS

| | | | |
|---|---|---|---|
| 6,078,893 A | 6/2000 | Ouimet et al. |
| 6,157,935 A | 12/2000 | Tran et al. |
| 6,169,955 B1 | 1/2001 | Fultz |
| 6,622,151 B1 | 9/2003 | Hamamoto et al. |
| 6,879,836 B2 | 4/2005 | Nakamoto et al. |
| 7,082,427 B1 | 7/2006 | Seibel et al. |
| 7,120,629 B1 | 10/2006 | Seibel et al. |
| 7,136,915 B2 | 11/2006 | Rieger, III |
| 7,142,205 B2 | 11/2006 | Chithambaram et al. |
| 7,174,301 B2 | 2/2007 | Florance et al. |
| 7,340,410 B1 | 3/2008 | Vaillancourt et al. |
| 7,386,318 B2 | 6/2008 | Moon et al. |
| 7,398,093 B2 | 7/2008 | Hull et al. |
| 7,429,969 B2 | 9/2008 | Chang |
| 7,439,969 B2 | 10/2008 | Chithambaram et al. |
| 7,516,088 B2 | 4/2009 | Johnson et al. |
| 7,548,915 B2 | 6/2009 | Ramer et al. |
| 7,797,019 B2 | 9/2010 | Friedmann |
| 7,797,642 B1 | 9/2010 | Karam et al. |
| 7,814,142 B2 | 10/2010 | Mamou et al. |
| 7,823,073 B2 | 10/2010 | Holmes et al. |
| 2001/0041566 A1 | 11/2001 | Xanthos et al. |
| 2002/0042819 A1 | 4/2002 | Reichert et al. |
| 2002/0055926 A1 | 5/2002 | Dan et al. |
| 2002/0123957 A1 | 9/2002 | Notarius et al. |
| 2002/0138612 A1 | 9/2002 | Sekizawa |
| 2003/0078788 A1 | 4/2003 | Sussman et al. |
| 2003/0158960 A1 | 8/2003 | Engberg |
| 2004/0040602 A1 | 3/2004 | Farrar |
| 2004/0070602 A1 | 4/2004 | Kobuya et al. |
| 2005/0096036 A1 | 5/2005 | Haberman et al. |
| 2005/0113115 A1 | 5/2005 | Haberman et al. |
| 2006/0022048 A1 | 2/2006 | Johnson |
| 2006/0277176 A1 | 12/2006 | Liao |
| 2007/0096945 A1 | 5/2007 | Rasmussen et al. |
| 2007/0100585 A1 | 5/2007 | Dulberg et al. |
| 2007/0110032 A1 | 5/2007 | Pimpler et al. |
| 2007/0112729 A1 | 5/2007 | Wiseman et al. |
| 2007/0192352 A1 | 8/2007 | Levy |
| 2007/0219938 A1 | 9/2007 | Boersma et al. |
| 2007/0271014 A1 | 11/2007 | Breed |
| 2008/0082572 A1 | 4/2008 | Ballard et al. |
| 2008/0086391 A1 | 4/2008 | Maynard et al. |
| 2008/0086512 A1 | 4/2008 | Fahys |
| 2008/0109317 A1 | 5/2008 | Singh |
| 2008/0140311 A1 | 6/2008 | Searight et al. |
| 2008/0168068 A1 | 7/2008 | Hutheesing |
| 2008/0214149 A1 | 9/2008 | Ramer et al. |
| 2008/0249708 A1 | 10/2008 | Tran |
| 2008/0262897 A1 | 10/2008 | Howarter et al. |
| 2008/0291205 A1 | 11/2008 | Rasmussen et al. |
| 2008/0306840 A1 | 12/2008 | Houlihan et al. |
| 2009/0048859 A1 | 2/2009 | McCarthy et al. |
| 2009/0089254 A1 | 4/2009 | Von Kaenel et al. |
| 2009/0094422 A1 | 4/2009 | Kems |
| 2009/0112816 A1 | 4/2009 | Marlow |
| 2009/0132502 A1 | 5/2009 | Brice et al. |
| 2009/0181699 A1 | 7/2009 | Tysowski |
| 2009/0197621 A1 | 8/2009 | Book |
| 2009/0234499 A1 | 9/2009 | Nielsen et al. |
| 2009/0234745 A1 | 9/2009 | Ramer et al. |
| 2009/0309709 A1 | 12/2009 | Bevacqua et al. |
| 2009/0319344 A1 | 12/2009 | Tepper et al. |
| 2010/0082444 A1 | 4/2010 | Lin et al. |
| 2010/0114941 A1 | 5/2010 | Von Kaenel et al. |
| 2010/0131196 A1 | 5/2010 | Searight et al. |
| 2010/0131584 A1 | 5/2010 | Johnson |
| 2010/0138299 A1 | 6/2010 | Preston et al. |
| 2010/0217480 A1 | 8/2010 | Link, II |
| 2010/0245174 A1 | 9/2010 | Okuyama et al. |
| 2010/0250369 A1 | 9/2010 | Peterson et al. |
| 2010/0251128 A1 | 9/2010 | Cordasco |
| 2010/0317366 A1 | 12/2010 | Shen et al. |
| 2010/0317368 A1 | 12/2010 | Augst et al. |
| 2011/0055172 A1 | 3/2011 | Tan et al. |
| 2011/0231055 A1 | 9/2011 | Knight et al. |
| 2012/0036016 A1 | 2/2012 | Hoffberg et al. |
| 2012/0158445 A1 | 6/2012 | Dufford et al. |
| 2012/0197724 A1 | 8/2012 | Kendall |
| 2012/0215378 A1 | 8/2012 | Sprock et al. |
| 2012/0233418 A1 | 9/2012 | Barton et al. |
| 2012/0233490 A1 | 9/2012 | Barton et al. |
| 2013/0253797 A1 | 9/2013 | McNew |
| 2014/0316640 A1 | 10/2014 | Dippl et al. |

OTHER PUBLICATIONS

Jul. 25, 2014—U.S.—Office Action—U.S. Appl. No. 13/083,139, 25 pages.

Dzenana et al., "Integration of Spatial Data with Business Intelligence Systems", Bosnia, Dec. 16-18, 2008, pp. 447-452, BH Telecom.

Hosokawa, et al., "An Implementatoin Method of a Location-Based Active Map Transformation System", 2005, pp. 13-21, MDM May 2005 Ayia Napa Cyprus.

Franti et al., "Location-Based Search Engine for Mulimedia Phones", magazine, 2010, pp. 558, 563, IEEE, Filand.

Kalasapur et al., "Extracting Co-locator context", Mar. 27, 2009, pp. 1-7, http://dx.doi.org/10.4108/ICST.MOBIQUITOUS2009.6857, San Jose, CA.

Brown, "Intelligent Agent based Mobile Shopper", Mar. 2009, 7 pgs., 978-1-4244-3474 © 2009 IEEE, Jamaica.

Gao, et al., "A Wireless-Based Virtual Salesman System", 2004, pp. 581-588, 0-7803-8145-9/04 © 2004 IEEE, San Jose, CA.

Mar. 15, 2014—U.S.—Office Action—U.S. Appl. No. 13/083,139, 30 pages.

May 24, 2017—U.S. NonFinal Office Action—U.S. Appl. No. 14/635,592.

ENHANCED GEOCODING

This application is a continuation of commonly assigned, co-pending U.S. application Ser. No. 14/635,592, filed Mar. 2, 2015, which is a continuation of U.S. application Ser. No. 14/027,498 (now U.S. Pat. No. 8,972,167), filed Sep. 16, 2013, which is a continuation of U.S. application Ser. No. 13/083,136 (now U.S. Pat. No. 8,538,679), filed Apr. 8, 2011; all of the aforementioned are herein incorporated by reference in their entireties.

RELATED APPLICATIONS

This application is related to U.S. application Ser. No. 13/083,139 (published as US2015/0371158), which was concurrently filed with the priority patent application, and which is herein incorporated by reference in its entirety.

TECHNICAL FIELD

Aspects of the disclosure generally relate to geocoding and enhanced disposition monitoring with geocoding. In particular, various aspects of the disclosure include methods and systems for locating predetermined addresses on a map grid, and receiving, transmitting, maintaining, and/or analyzing disposition and related information associated with geocoded information.

BACKGROUND

Geocoding refers to the process of finding the correct geographic coordinates (e.g., latitude and/or longitude coordinates) from data such as street addresses, zip codes, postal codes, etc. Over the years, various geocoding techniques involving address interpolation, the use of land parcel centroids, and the use of global positioning systems (GPS) have been developed However, problems remain with using these systems/methods for practical geocoding applications. For instance, a geocoding system may fail when several different addresses may be listed under similar names and/or when a given address encompasses an area beyond a threshold value.

In addition, handheld systems are known in the package delivery industry for tracking the status/progress of delivery of a mailed package. In such systems, a delivery truck driver may use a wireless handheld device to manually enter information about the delivery of a package. For example, when a package is delivered, the recipient of the package may sign his/her name onto the handheld device to confirm receipt. The delivery confirmation may be upload in realtime to a remote server where the time and date of the delivery may be displayed to users. Such systems, however, are deficient in numerous aspects.

Furthermore, systems are known for tracking the whereabouts of delivery and sales people. The location of such people may be displayed on a map in realtime. Such maps may generate and display the position of a particular GPS coordinate where a sales person may be located and use known mapping technologies to generate the display. However, such systems are deficient in numerous aspects.

As discussed above, there are problems associated with the way addresses are currently located on a map.

BRIEF SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the disclosure address one or more of the issues mentioned above by disclosing methods, computer readable media, and apparatuses for locating physical addresses close to an entity. An enhanced geocoding module may be used to locate physical addresses close to a predetermined location.

With another aspect of the disclosure, an enhanced geocoding module may return physical addresses that are on a predetermined street, lane, road, alley, or some other thoroughfare. This feature may be implemented as a hardware module either in a mobile device and/or a fixed-location computing device. In either scenario, a user of the device may specify a location (e.g., latitude/longitude coordinates, street address, etc.) that the enhanced geocoding module may use as a base location or address in returning other addresses or locations. Alternatively, a location tracking system (e.g., global positioning system (GPS), etc.) embedded within the device may first determine the current location and use the current location to return other addresses or locations.

Aspects of the disclosure address one or more of the issues mentioned above by disclosing methods, computer readable media, and apparatuses for maintaining a comprehensive data store (e.g., database) of sales dispositions (e.g., no answer; answered, but did not allow conversation; no solicitation sign on premises; answered, heard pitch, but not interested; reason stated by customer for declining service: too expensive, bad impression of brand, want organic, lactose intolerant or allergic; other; follow-up at particular date/time (and whether left sample); person will call if interested; started service with promotion code; other) provided by sales people using mobile, handheld devices. In addition, the handheld device may provide the salesperson with information (e.g., whether the household is a current/former customer, the date/time of last contact with the customer and disposition, other notes/comments entered about the household, etc.) about a particular household before (or as) the salesperson is approaching the house.

The handheld system may include one or more modules, including but not limited to an enhanced disposition monitoring module and/or an enhanced geocoding module. The modules may be implemented as hardware/software modules either in a mobile device and/or a fixed-location computing device. The enhanced disposition monitoring module may assist in performing one or more of the steps mentioned previously mentioned above.

The enhanced geocoding module may assist in locating physical addresses close to the salesperson on a single street. The enhanced geocoding module may be used to locate physical addresses close to a predetermined location (e.g., close to an entity on a single street, lane, road, alley, or some other thoroughfare). In either scenario, a user of the device may specify a location (e.g., latitude/longitude coordinates, street address, etc.) that the enhanced geocoding module may use as a base location or address in returning other addresses or locations situated on a single street and close to the base location or address. Alternatively, a location tracking system (e.g., global positioning system (GPS), etc.) embedded within the device, in some embodiments, may first determine the current location of a user and use the current location to return other addresses or locations situated on a single street and close to the current location or address.

In some embodiments, the handheld device may query a remote server to obtain and cache disposition information about the other street addresses returned. As such, the responsiveness of the handheld system may be improved.

In addition, aspects of the disclosure may be provided in a computer-readable medium having computer-executable instructions to perform one or more of the process steps described herein.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

The present invention is illustrated by way of example and is not limited in the accompanying figures in which like reference numerals indicate similar elements and in which.

DETAILED DESCRIPTION

Figure 1:
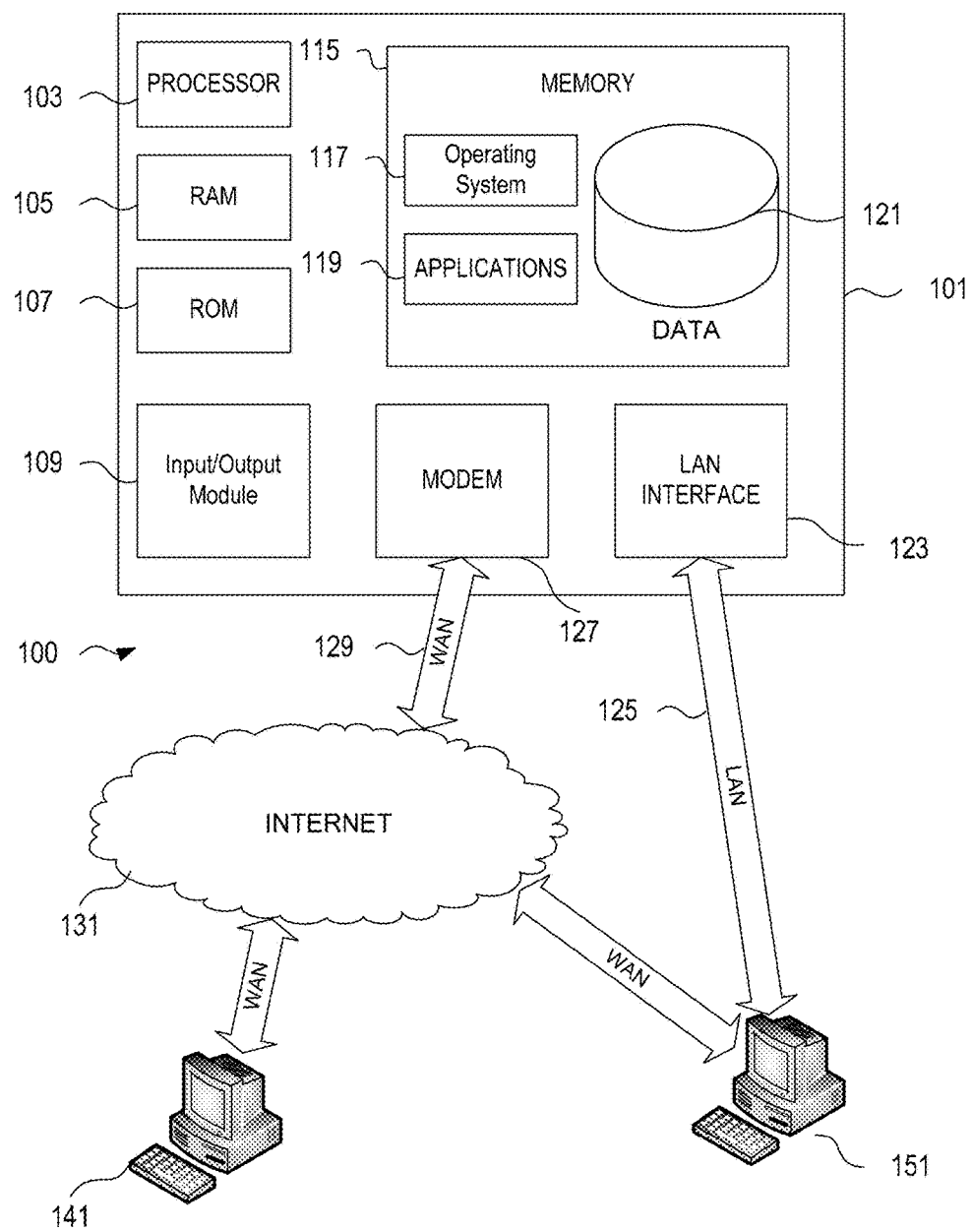
FIG. 1 shows an illustrative operating environment in which various aspects of the disclosure may be implemented.

As discussed herein, in various embodiments an enhanced disposition monitoring module may be provided in a plurality of computing devices (e.g., handheld computing device, remote server, etc.) An enhanced disposition monitoring module in a handheld mobile computing device (e.g., smartphone, tablet, laptop, mobile phone, etc.) may receive disposition information and transmit (e.g., wirelessly transmit) that information to a remote server. Also, the handheld mobile computing device may display historical disposition information received from a remote server.

Meanwhile, a corresponding enhanced disposition monitoring module in a remote computing device (e.g., server, etc.) may receive information transmitted from a plurality of handheld mobile computing devices and store that information. Also, the remote computing device may analyze the collected disposition and other information (e.g., geocoded information associated with the disposition information) and generate one or more reports and or rules based on the analysis. For example, reports may be generated showing the performance of sales people (e.g., door-to-door salespeople) operating handheld tablet devices around different neighborhoods. The analyzed information and reports may be used to create a data model to improve sales performance and/or efficiency.

In addition, the collected information and data model resulting from an analysis of that information may be licensed or sold to third-party entities. For example, the analyzed information may assist in identifying the best time of day and/or day of week to attempt an in-person sale at person's home. In another example, a third-party providing complementary services/products may use the database of collected information and data model to identify and target potential sale leads. In yet another example, a third-party providing unrelated services/products (e.g., a political campaign) may use the collected information to identify and target homes for solicitation and/or visitation.

In some examples in accordance with various aspects of the disclosure, the interactive system of handheld computing devices and remote server may also be used to assist salespeople in locating each other and coordinating efforts. For example, each handheld computing device may display a map indicating the location of the other salespeople with their respective handheld computing devices. As such, each salesperson can coordinate neighborhoods and geographical areas of coverage. In another example, the disposition of a home may be displayed on the aforementioned map, but those dispositions that occurred most recently (e.g., in the last day, in the last week, etc.) may be drawn with a larger icon (e.g., a larger circle) to indicate the recency of the in-person visit. As time progresses, the icon may be rendered incrementally smaller to reflect that the last visit occurred in the past accordingly. The handheld computing devices may receive, in some embodiments, a near realtime (e.g., every minute, or some other period of time) update from a remote server to reflect the movement of other salespeople. In another embodiment, the handheld computing device may receive updated position information about other salespeople's coordinates only upon manual request (e.g., when the device uploads information to a remote server) or at regular predetermined intervals (e.g., every ten minutes, every sixty seconds, twice an hour, etc.)

FIG. 1 illustrates a block diagram of an enhanced geocoding module/device 101 (e.g., a computer server) in communication system 100 that may be used according to an illustrative embodiment of the disclosure. The device 101 may have a processor 103 for controlling overall operation of the enhanced geocoding module 101 and its associated components, including RAM 105, ROM 107, input/output (I/O) module 109, and memory 115.

I/O 109 may include a microphone, keypad, touch screen, and/or stylus through which a user of the enhanced geocoding module 101 may provide input, and may also include one or more of a speaker for providing audio output and a video display device for providing textual, audiovisual and/or graphical output. Software may be stored within memory 115 and/or storage to provide instructions to processor 103 for enabling module 101 to perform various functions. For example, memory 115 may store software used by the device 101, such as an operating system 117, application programs 119, and an associated database 121. Processor 103 and its associated components may allow the device 101 to run a series of computer-readable instructions to generate a rectangular grid for determining the physical addresses that are closest to a given location. For instance, when the geocode of a mobile device is determined, processor 103 may create a grid with the geocode of the mobile device at the center of the grid. In addition, processor 103 may create several coordinate points around the center of the grid so that a reverse geocoding server may be called to reverse the geocodes of the various coordinate points into physical addresses.

The server 101 may operate in a networked environment supporting connections to one or more remote computers, such as terminals 141 and 151. The terminals 141 and 151 may be personal computers or servers that include many or all of the elements described above relative to the computing device 101. Alternatively, terminal 141 and/or 151 may be a reverse geocoding server called by module 101 to reverse the geocode of various coordinate points on a grid into physical addresses. The network connections depicted in FIG. 1 include a local area network (LAN) 125 and a wide area network (WAN) 129, but may also include other networks. When used in a LAN networking environment, the server 101 is connected to the LAN 125 through a network interface or adapter 123. When used in a WAN networking environment, the server 101 may include a modem 127 or other means for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP and the like is presumed.

Additionally, an application program 119 used by the enhanced geocoding module 101 according to an illustrative embodiment of the disclosure may include computer executable instructions for invoking functionality related to creating a rectangular grid for locating addresses on a single street.

Enhanced geocoding module 101 and/or terminals 141 or 151 may also be mobile terminals, such as smart phones, personal digital assistants (PDAs), etc. including various other components, such as a battery, speaker, and antennas (not shown).

The disclosure is operational with numerous other general purpose or special purpose computing system environments or configurations. Examples of well known computing systems, environments, and/or configurations that may be suitable for use with the disclosure include, but are not limited to, personal computers, server computers, handheld or laptop devices, multiprocessor systems, microprocessor-based systems, set top boxes, programmable consumer electronics, network PCs, minicomputers, mainframe computers, and distributed computing environments that include any of the above systems or devices, and the like.

The disclosure may be described in the general context of computer-executable instructions, such as program modules, being executed by a computer. Generally, program modules include routines, programs, objects, components, data structures, etc. that perform particular tasks or implement particular abstract data types. The disclosure may also be practiced in distributed computing environments where tasks are performed by remote processing devices that are linked, for example, through a communications network. In a distributed computing environment, program modules may be located in both local and remote computer storage media including memory storage devices.

Figure 2A:
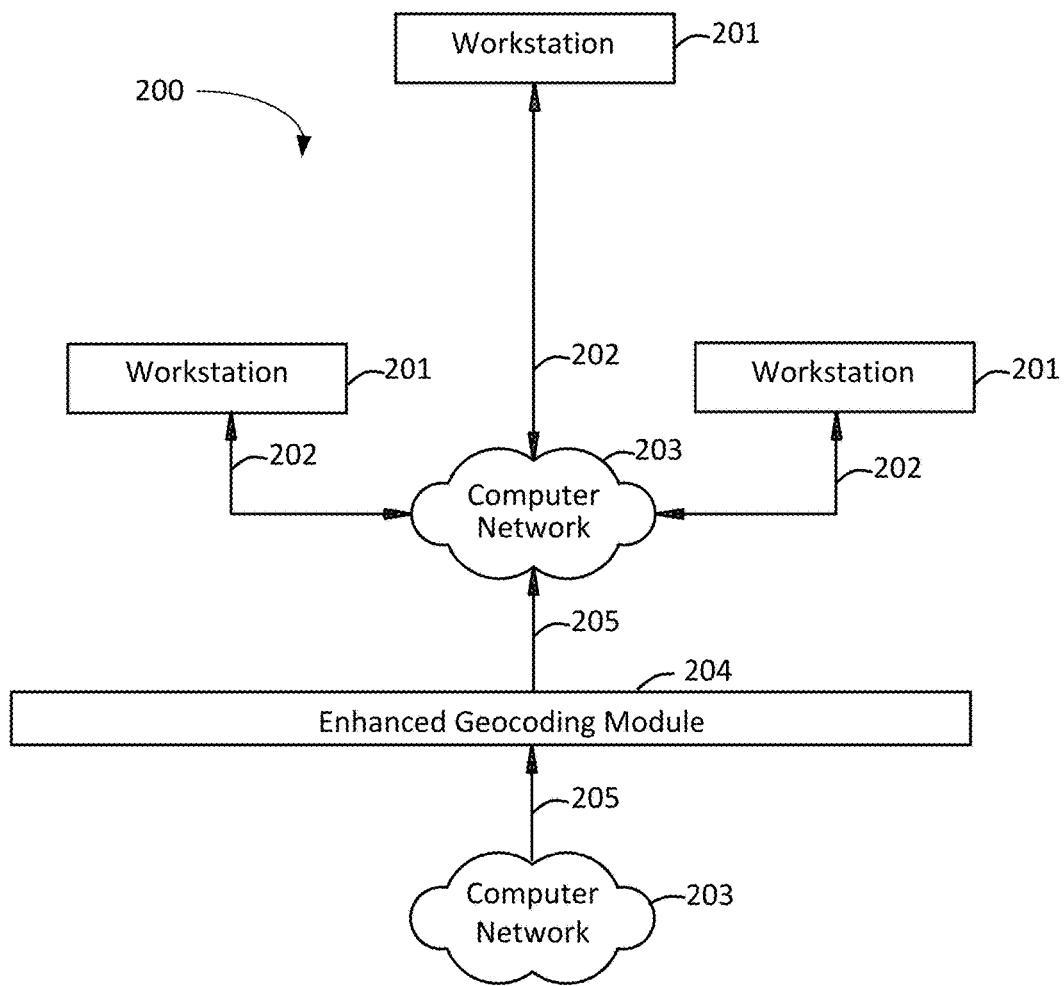
FIG. 2A and FIG. 2B are illustrative block diagrams of workstations and servers that may be used to implement the processes and functions of one or more aspects of the present disclosure.

Referring to FIG. 2A, an illustrative system 200 for implementing methods according to the present disclosure is shown. As illustrated, system 200 may include one or more workstations/servers 201. Workstations 201 may be local or remote, and are connected by one or more communications links 202 to computer network 203 that is linked via communications links 205 to the enhanced geocoding module 204. In certain embodiments, workstations 201 may be different servers that reverse the geocode of coordinate points provided by module 204, or, in other embodiments, workstations 201 may be different computing devices (e.g., mobile devices) mapped by enhanced geocoding module 204. In system 200, the enhanced geocoding module 204 may be any suitable server, processor, computer, or data processing device, or combination of the same.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, etc.

The disclosure that follows in the Figures may be implemented by one or more of the components in FIGS. 1 and 2A and/or other components, including other computing devices.

In accordance with various aspects of the disclosure, methods, computer-readable media, and apparatuses are disclosed in which an enhanced geocoding module 204 may locate addresses located on a single street, lane, alley, gulley, road, or other thoroughfare. To accomplish this task, the geocode of the enhanced geocoding module 204 may be extracted. In some embodiments, the geocode of a predetermined point specified by a user using enhanced geocoding module 204 may be extracted. The geocode may refer to any of several geospatial attributes, including latitude, longitude, altitude, date, time, and/or internet protocol (IP) address. Then the enhanced geocoding module 204 may create a grid with a predetermined granularity around the extracted geocode. The granularity of a grid may refer to the distance between any two coordinate points of the grid. The extracted geocode of enhanced geocoding module 204 may be located at the center of the grid; then enhanced geocoding module 204 may create several coordinate points around the grid. Next, enhanced geocoding module 204 may make a batch request to a server (e.g., via an application programming interface (API) of a server such as one maintained by Google, Microsoft, etc.) to reverse the geocodes of each of the coordinate points on the grid into physical addresses.

Once a call is made to the reverse geocoding server (e.g., terminals 141/151 and/or workstations 201) to reverse the geocode of a given coordinate point, this coordinate point and its associated physical address may be saved in a memory of the enhanced geocoding module 204 to avoid having to make repeated calls to the reverse geocoding server for the same physical address.

Enhanced geocoding module 204 may then sort the physical addresses in order of how far they are from the enhanced geocoding module 204. The physical addresses that are the closest to the enhanced geocoding module 204 may then be presented to a user on a display screen of the enhanced geocoding module 204. All of the physical addresses located on a single street may be grouped and presented to a user in an order consistent with how far the physical addresses are from the user of the enhanced geocoding module 204 or consistent with how far the physical addresses are from some other user specified location. In this way, the enhanced geocoding module 204 may present physical addresses to a user via a two-tiered sorting technique-first the addresses may be sorted by street and then these same-street addresses may be sorted by distance from the enhanced geocoding module 204.

In addition, enhanced geocoding server 204 may overlay various icons related to the returned physical addresses on a map representing the addresses. These icons may be supplied to the enhanced geocoding server 204 by the reverse geocoding server, along with the physical addresses. The icons may be used to represent physical addresses (e.g., homes, business addresses, etc.) that may have a record in a database (e.g., workstation 201) maintained by an entity using the enhanced geocoding module 204.

In an alternate embodiment, enhanced geocoding module 204 may use a predetermined global positioning system (GPS) coordinate to draw a circle around the GPS coordinate and determine the radial distances of the nearest physical addresses to the GPS coordinate. Therefore, instead of drawing a grid, enhanced geocoding module 204 may use various points within the circle to make a batch request to a reverse geocoding server for physical addresses associated with one or more GPS coordinates within the circle.

One of the drawbacks of this technique is that by looking at the radial distances to a given GPS coordinate, the reverse geocoding server may return physical addresses that are not located on the same street, alley, road, gulley, and/or other thoroughfare. Thus, these addresses may not in fact be the closest physical addresses to a given location, as determined by the amount of time that it takes to walk, drive, etc. to the addresses.

As opposed to techniques involving the use of radial distances from a given GPS coordinate, the approach of using grids for finding the nearest physical address allows addresses on the same street, lane, alley, gulley, road, or other thoroughfare to be located.

The distance between grid points may be variable and may be presented in any distance units, including miles, kilometers, feet, yards, etc. For instance, the coordinate points of the grid may be close together when mapping densely populated urban areas and may be farther apart when mapping sparsely populated rural areas. In other embodiments, the distance between grid points may be an average value, regardless of the area being mapped.

The grid itself may be a rectangular grid. In some aspects, the size of the grid may be created so as to minimize the number of calls to the reverse geocoding server. For some applications, the grid may include 81 coordinate points.

The geographical area covered by the grid points may be determined by a zoom level, as set by the enhanced geocoding server 204. An appropriate zoom level may need to be chosen in order to allow the proper coordinate points to be returned by the reverse geocoding server.

Figure 2B:
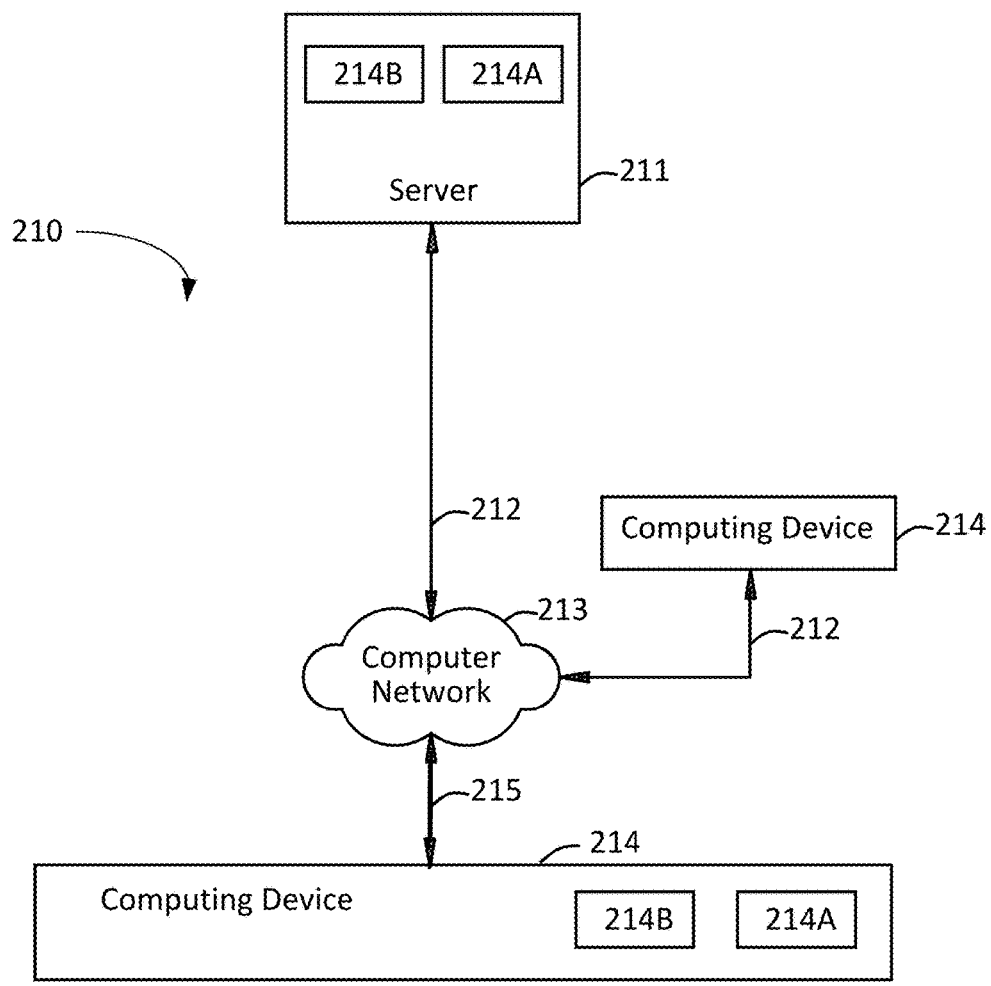

Referring to FIG. 2B, an illustrative sales management computer system 210 for implementing methods according to the present disclosure is shown. As illustrated, system 210 may include one or more computing devices 214 and one or more workstation servers 211. Server 211 may be local or remote, and are connected by one or more communications links 212 to computer network 213 that is linked via communications links 215 to the computing device 214. In certain embodiments, workstation server 211 may be different servers that reverse the geocode of coordinate points provided by one or more modules in computing device 214, or, in other embodiments, workstation server 211 may be different computing devices (e.g., mobile devices) mapped by computing device 214. In system 210, the computing devices 214 may be any suitable server, processor, computer, or data processing device, or combination of the same, as illustrated in computing device 101 in FIG. 1.

Computer network 213 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 212 and 215 may be any communications links suitable for communicating between workstation server 211 and server (e.g., computing devices 214), such as network links, dial-up links, wireless links, hard-wired links, etc.

The disclosure that follows in the Figures may be implemented by one or more of the components in FIGS. 1 and 2B and/or other components, including other computing devices.

In accordance with various aspects of the disclosure, methods, computer-readable media, and apparatuses are disclosed in which an enhanced geocoding module 214A configured to operate in computing device 214 may locate addresses located on a single street, lane, alley, gulley, road, or other thoroughfare. To accomplish this task, the geocode of the computing device 214 may be extracted. In some embodiments, the geocode of a predetermined point specified by a user may be extracted using the enhanced geocoding module. The geocode may refer to any of several geospatial attributes, including latitude, longitude, altitude, date, time, and/or internet protocol (IP) address. Then the enhanced geocoding module may create a grid with a predetermined granularity around the extracted geocode. The granularity of a grid may refer to the distance between any two coordinate points of the grid. The extracted geocode of enhanced geocoding module may be located at the center of the grid; then enhanced geocoding module may create several coordinate points around the grid. Next, enhanced geocoding module may make a batch request to a server (e.g., via an application programming interface (API) of a server such as one maintained by Google, Microsoft, etc.) to reverse the geocodes of each of the coordinate points on the grid into physical addresses.

Once a call is made to the reverse geocoding server (e.g., computing devices 141/151 and/or workstations 211) to reverse the geocode of a given coordinate point, this coordinate point and its associated physical address may be saved in a memory of the enhanced geocoding module 214A to avoid having to make repeated calls to the reverse geocoding server for the same physical address.

Enhanced geocoding module 214A may then sort the physical addresses in order of how far they are from the enhanced geocoding module. The physical addresses that are the closest to the enhanced geocoding module may then be presented to a user on a display screen of the enhanced geocoding module. All of the physical addresses located on a single street may be grouped and presented to a user in an order consistent with how far the physical addresses are from the user of the enhanced geocoding module or consistent with how far the physical addresses are from some other user specified location. In this way, the enhanced geocoding module may present physical addresses to a user via a two-tiered sorting technique-first the addresses may be sorted by street and then these same-street addresses may be sorted by distance from the enhanced geocoding module.

In addition, as described in US2015/0371158 (with U.S. application Ser. No. 13/083,139), which was previously incorporated by reference herein, the enhanced geocoding module 214A may provide additional features and aspects including, but not limited to, icons for overlaying on a map representing addresses, variable-distance grid points to account for varying density of population in areas and other factors, alternate grid-like techniques using radial distance from a particular coordinate, and other features.

Figure 3:
FIG. 3 shows a sample display screen associated with enhanced geocoding module in accordance with one or more aspects of the disclosure.

FIG. 3 shows a sample display screen 300 associated with enhanced geocoding module 204 in accordance with at least one aspect of the disclosure. The display screen associated the enhanced geocoding module 204 may present a map 302 with various physical addresses located on the same street that are close to the enhanced geocoding module 204 and the icons 304 associated with those addresses. The display screen 300 may also present a statistics section 306 on individuals/groups associated with an entity managing the enhanced geocoding module 204. For instance, a company may use the enhanced geocoding module 204 to track the performance of its salespersons as they visit various homes within a neighborhood (e.g., for selling and/or delivering milk, insurance, etc.).

The statistics in statistics section 306 may be displayed over various time periods, including a day, week, month, or pay period. Statistics in statistics section 306 may be shown for a given individual/group (e.g., a user of enhanced geocoding module 204), as well as the average value of various statistics for an entire group and the identity of the leader of each statistic. The statistics may include a given salesperson's sign-ups, close rate, attempt rate, contact rate, attempts, contacts, hours, and sign-ups per hour. The salesperson's sign-ups may relate to the number of customers that the salesperson actually convinced to signup for services/products provided by the company, the close rate may represent the number of sign-ups attributed to a given salesperson compared to the total number of potential customers visited, the attempt rate may refer to the total number of potential customers that a given salesperson visits, the contact rate may refer to the total number of potential customers that a given salesperson contacts using any communication modality (e.g., phone, mail, etc.), the attempts may refer to the total number of attempts made by a given salesperson at acquiring new customers, the contacts may refer to the total number of contacts or leads for potential customers as developed by a given salesperson, the hours may refer to the total number of hours that a given salesperson spends mining for potential customers, and the sign-ups per hour may refer to the number of sign-ups attributed to a given salesperson per hour on the job.

The display screen 300 may also display a physical addresses section 308 in which various physical addresses that are shown on the map 302 are shown, sorted by street and distance from the enhanced geocoding module 204. In displaying the physical addresses section 308, the display screen 300 may also use various color codes (e.g., red, yellow, green) to represent the status of potential customers/customers located at the physical address. In one embodiment, red may be used to designate physical addresses that house current customers of a company using enhanced geocoding module 204, yellow may be used to designate physical addresses that house former customers of the company, and green may be used to designate physical addresses that house potential customers of the company.

In yet another example, FIG. 3 shows a sample display screen 300 associated with enhanced geocoding module 214A and enhanced disposition monitoring module 214B in accordance with at least one aspect of the disclosure. The display screen associated with the enhanced geocoding module may present a map 302 with various physical addresses located on the same street that are close to the enhanced geocoding module and the icons 304 associated with those addresses. The display screen 300 may also with the enhanced disposition monitoring module 214B present a statistics section 306 on individuals/groups associated with an entity managing the mobile computing device 214. For instance, a company may use the enhanced disposition monitoring module 214B to collect information about and track the performance of its salespersons as they visit various homes within a neighborhood (e.g., for selling and/or delivering milk, insurance, etc.).

Figure 4:
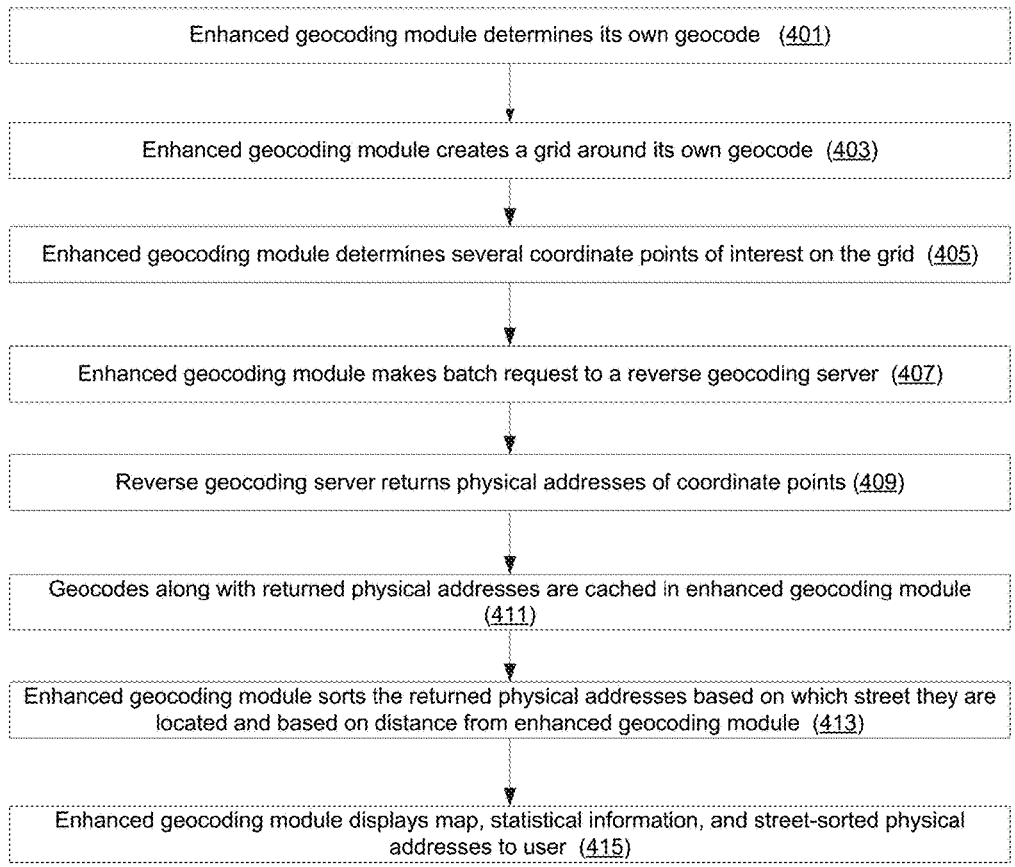
FIG. 4 shows a sample method that may be performed with an enhanced geocoding module in accordance with one or more aspects of the disclosure.

FIG. 4 shows a sample method that may be performed with an enhanced geocoding module 204 in accordance with at least one aspect of the disclosure. The process may start out at step 401 where the enhanced geocoding module 204 may determine its own geocode (e.g., a geocode of a mobile device or a fixed computing device provides the geocode of a desired location). The process may then move to step 403 where the enhanced geocoding module 204 may create a grid around its own geocode or some other user-specified geocode. The grid may be a rectangular grid with a specified granularity.

The process may then move to step 405 where the enhanced geocoding module 204 may determine several coordinate points of interest on the grid. These coordinate points may represent locations that are close to the present location of the module 204. The enhanced geocoding module 204 may then make a batch request to a reverse geocoding server to provide the street-level addresses of the coordinate points in step 407.

Once the request is made, the reverse geocoding server may return the physical addresses of the coordinate points in step 409. The geocodes along with the returned physical addresses may be cached in the enhanced geocoding module 204 in step 411. The process may then move to step 413 where the enhanced geocoding module 204 may sort the returned physical addresses based on the street location and based on the distance from the enhanced geocoding module 204 and/or the distance from a user-specified point (e.g., in the case where the enhanced geocoding module 204 is a fixed computing device requesting addresses around a given coordinate point).

Finally, the process may move to step 415 where the enhanced geocoding module 204 may display a map, statistical information, and street-sorted physical addresses to a user. As described earlier, the map may include icons that indicate the status of various potential groups/individuals that may or may not be customers of an entity using the enhanced geocoding module 204. The statistical information may detail various statistics on individuals/groups associated with the entity (e.g., customer sign-ups, hours logged, etc.).

Figure 8:
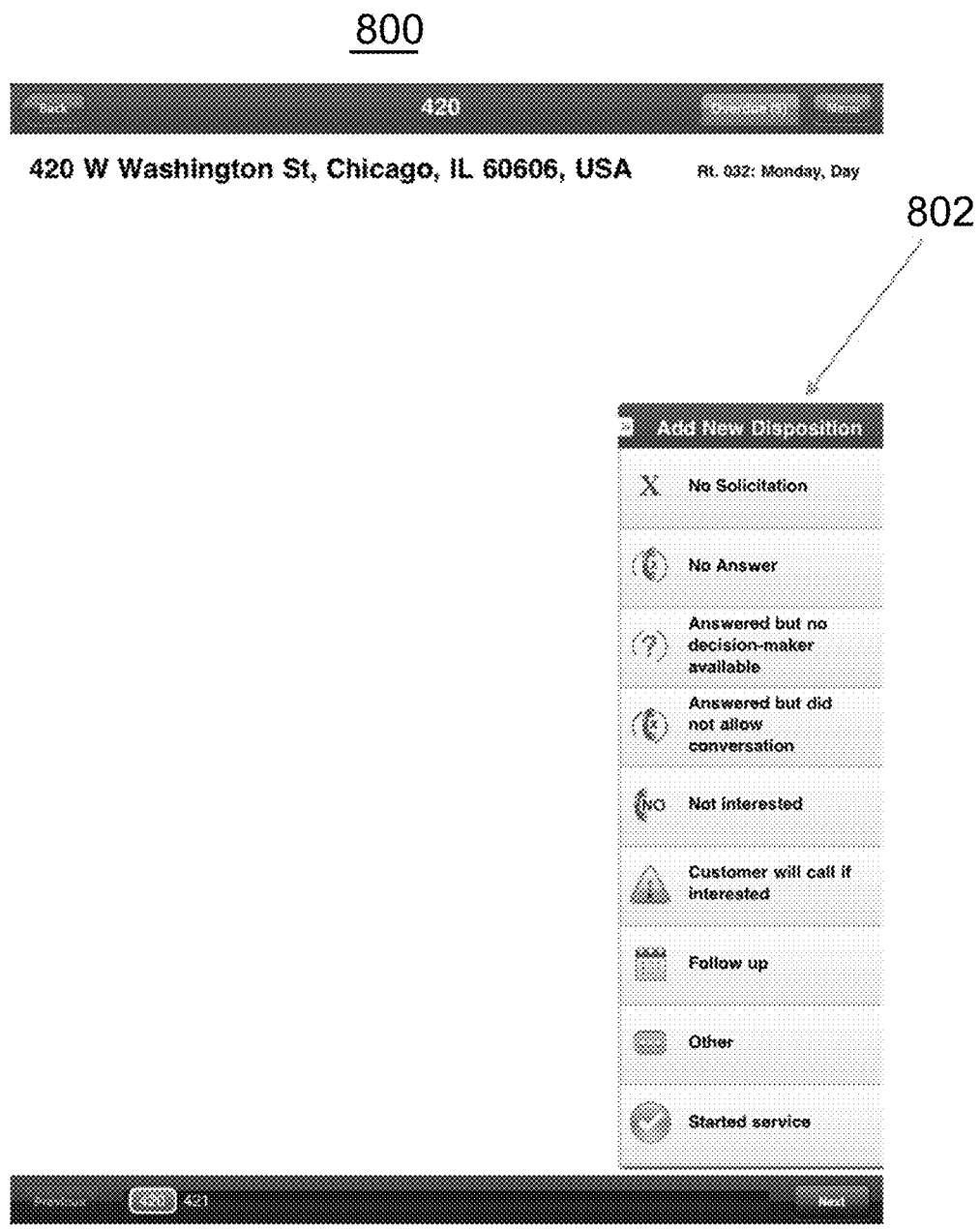
FIG. 8 shows another sample display screen associated with enhanced disposition monitoring module in accordance with one or more aspects of the disclosure.

Referring to FIG. 8, that figure illustrates an exemplary screen display 800 of a computing device 141 where a user may select a disposition after visiting a home (e.g., at 420 W. Washington Street). The user may be presented with a list 802 of predetermined dispositions for selection. Some examples of dispositions include "no solicitation," "no answer," "not interested," "started service", and others. In addition, the user may select "other" if none of the predetermined dispositions apply. The selected disposition may be saved on the computing device 214, and then transmitted to a remote server 211 for storage, maintenance, and analysis. In addition to the disposition information (e.g., "no solicitation"), the geocoded information associated with the disposition (e.g., the address of the home—420 W. Washington St.) and other information (e.g., time of day, date, zip code, state, sales region, identity and/or attribute of sales person operating mobile device (e.g., name, experience level, sales success rating, gender, race, age, and/or other demographics/statistics) and other useful information) may also be saved. The remote server 211 may analyze the disposition information and other information using the enhanced disposition monitoring module 214B. The analysis may, for example, flag a particular address or address block as untouchable (e.g., prohibiting door-to-door sales activity) because of "no solicitation" signs. In such an example, the server 211 (e.g., second enhanced disposition monitoring module 214B) may generate and transmit a message indicating the prohibited status of the area to the mobile computing device 214. When the mobile computing device 214 is within the vicinity of the particular geographic area and determines its geocoded coordinates, the system may display (e.g., on a display of the mobile computing device 214) the message in association with the particular physical addresses that intersect (e.g., fall within either partially or fully) the particular geographic area. In yet another example, the analysis may be used to generate one or more reports evaluating the performance of salespeople.

Figure 6:
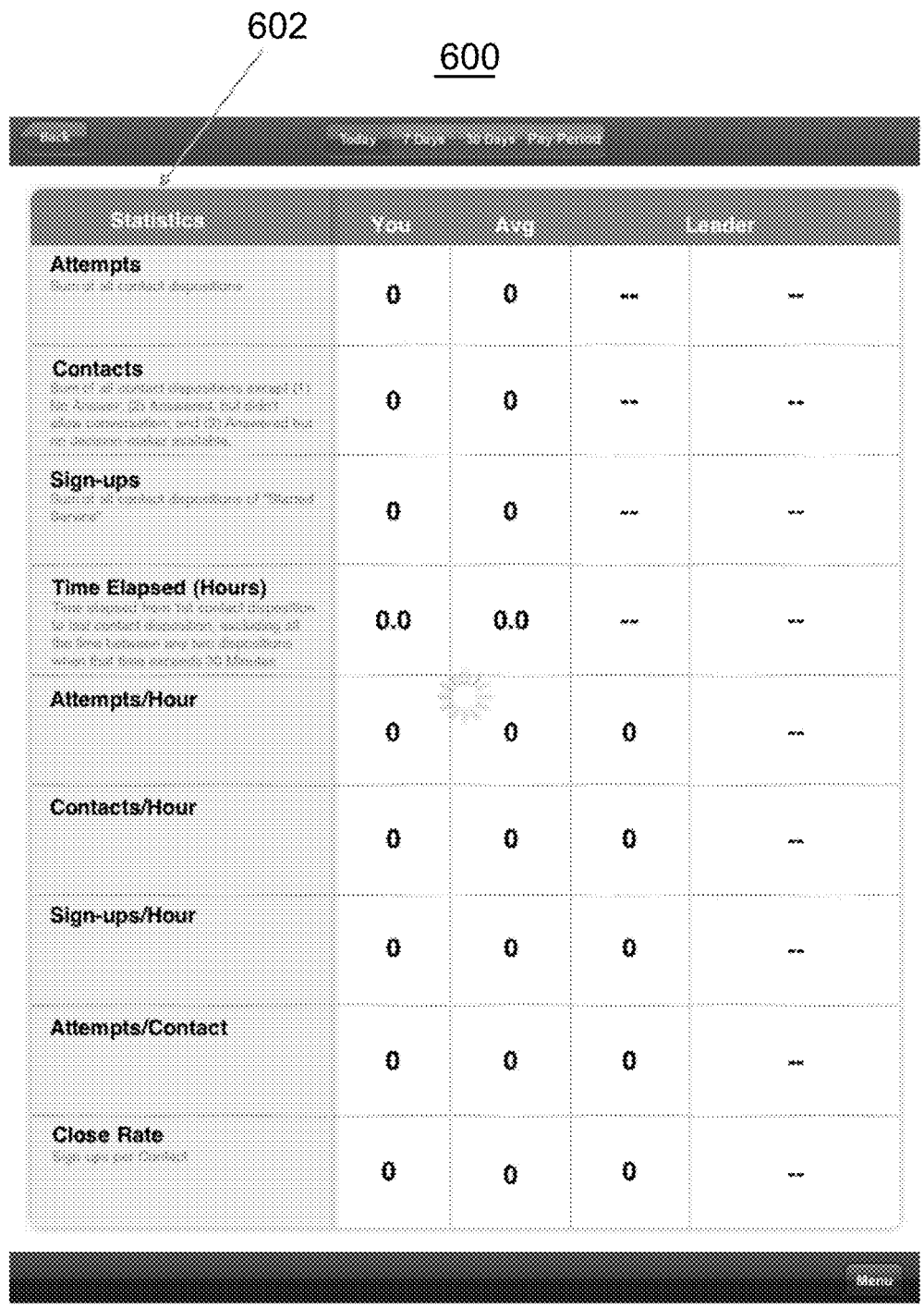
FIG. 6 shows another sample display screen associated with enhanced disposition monitoring module in accordance with one or more aspects of the disclosure.
Figure 7:
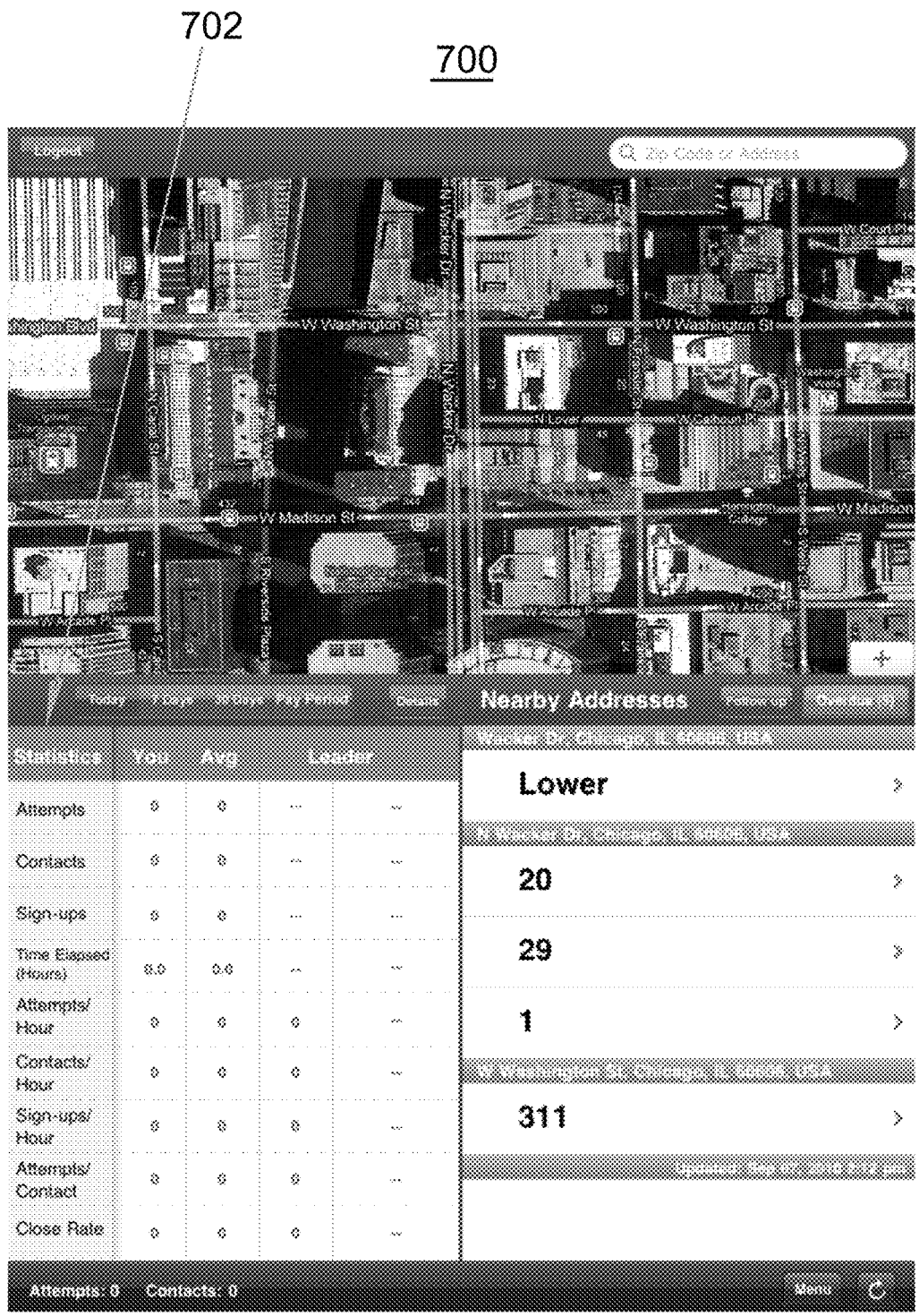
FIG. 7 shows yet another sample display screen associated with enhanced disposition monitoring module in accordance with one or more aspects of the disclosure.

FIG. 6 and FIG. 7 show additional sample display screens 600, 700 associated with an enhanced disposition monitoring module 214B in accordance with one or more aspects of the disclosure. As illustrated in FIG. 8, a list 602 of dispositions is displayed, along with statistics about each disposition. A user may compare his/her performance as compared to the average performance of other users (e.g., salespeople). The handheld computing device displaying screen 600 may query a remote server to obtain other historical data (e.g., data over a 7-day period, 30-day period, or a "pay period") for display to the user. Similar to FIG. 3, a screen 700 may be displayed showing a map (e.g., satellite image, political map, elevation map, etc.) of a region and dispositions in that region. In addition, a table 702 may be displayed with statics about dispositions and other information as compared to the user, the average of all users, and a leader. The information displayed may be received from server 211 (e.g., enhanced disposition monitoring module 214B) as a generated message or report. One of skill in the art after review of the entirety disclosed herein will appreciate that other desired statistics and information may be displayed (e.g., whether a household is a current customer, former customer, or not a customer; a date of last contact with the household and its resulting sales disposition; and other comments about the household).

In another example in accordance with various aspects of the disclosure, a user (e.g., a salesperson or a door-to-door representative) may activate a software application on their handheld mobile computing device 214 while on a door-to-door sales campaign. The software application, using one or more modules 214A/214B, may communicate the device's coordinates to a remote server 211. The server 211, using one or more modules 214A/214B, may generate a message/report indicating various information about numerous physical addresses (e.g., home addresses, business addresses, etc.) in the vicinity of the user. Upon receipt of the generated messages, the mobile computing device 214 may cache the generated message(s) with their associated physical addresses. As such, when the user approaches a target destination, the mobile computing device 214 may display useful information about the destination (e.g., prior sales dispositions, etc.) on a screen of the mobile computing device 214 before the user reaches the target destination. One skilled in the art will appreciate after review of the entirety disclosed herein that speed of information retrieval may be beneficial to a user (e.g., salesperson) who desires to make the most sales (or solicitations/servicing of any type) in the least amount of time.

Figure 5:
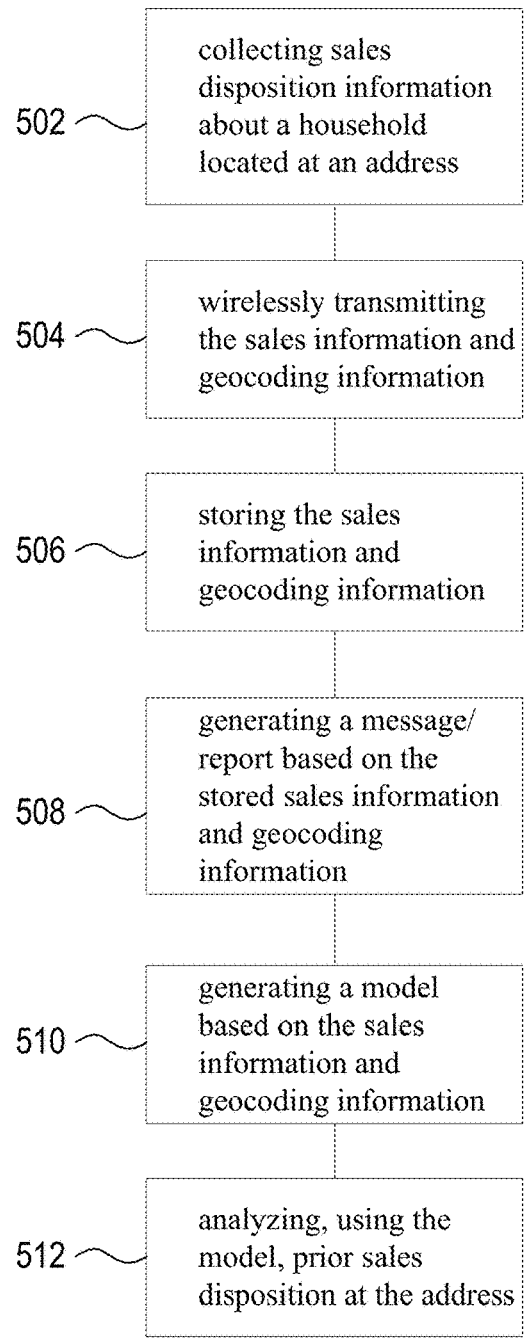
FIG. 5 shows illustrative steps of a method in accordance with one or more aspects of the disclosure.

FIG. 5 shows illustrative steps of a method in accordance with one or more aspects of the disclosure. In step 502, sales disposition information may be collected at a handheld computing device. The disposition information may be about a household located a particular address. The address may be calculated using an enhanced geocoding module, as described herein. In step 504, the sales disposition information and geocoding information may be wirelessly transmitted from the handheld device to a remote server. The remote server may store the aforementioned information, in step 506. In step 508, one or more reports may be generated based on the stored sales information and geocoding information at the remote server. Salespeople and/or sales managers may reference the reports in determining sales targets and assignments. Furthermore, in step 501, a model may be generated based on the sales and geocoding information. The model may be used, in step 512, to analyze prior sales disposition information at a particular address. The analysis may be useful in determining the likelihood of success at the particular address given the time of day, day of week, and other variables associated with the in-person sales visit/solicitation.

In other examples in accordance with various aspects of the disclosure, the system 210 may be used for collecting information about and developing a model around door-to-door political campaigning. For example, information about the party affiliations of homes (i.e., physical addresses) may be stored in the system 210 and use to develop a model for identifying those neighborhoods that would benefit most from political door-to-door communications. In addition, the disclosure contemplates that the analysis and model may be used for application in identifying which addresses to provide paper mailing (e.g., brochures, leaflets, etc.) for political and non-political solicitations. In addition, the system 210 may be used in the context of assisting service professionals identify the best times and day of week to visit particular homes. In addition, the disclosure contemplates that the collected data and/or model may be separately licensed and/or used apart from the users/organization collecting the data. As such, the system 210 provides a comprehensive method for collecting pertinent data about household for numerous and a myriad of applications.

Aspects of the invention have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the invention.

We claim:

1. A geocoding mobile device, comprising:
   a communications unit capable of establishing a two-way communications link with a reverse geocoding server;
   a hardware module comprising circuitry configured to execute an enhanced geocoding module and an enhanced disposition monitoring module;
   a global positioning system communicatively coupled to the hardware module;
   a memory storing the enhanced geocoding module that, when executed by the hardware module, causes the geocoding mobile device to:

determine, by the global positioning system, a current location of the geocoding mobile device;

determine, by the enhanced geocoding module, a plurality of coordinate points on a grid around the current location, wherein a spacing of the coordinate points on the grid is based on a predetermined granularity and the coordinate points form a rectangular grid shape, and is such that physical addresses corresponding to at least one of the coordinate points are on a same thoroughfare as the current location;

send, to the reverse geocoding server via the communications link, the plurality of coordinate points on the grid and the current location;

receive, from the reverse geocoding server via the communications link, a plurality of physical addresses corresponding to the plurality of coordinate points;

sort, by the enhanced geocoding module, the plurality of physical addresses by which thoroughfare the plurality of physical addresses are located on and then by distance from the current location;

display, by the enhanced geocoding module on a display device communicatively coupled to the hardware module, the sorted plurality of physical addresses; and display, by the enhanced geocoding module on the display device, in association with the plurality of physical addresses in the sorted list, additional information about at least one of the plurality of physical addresses; and display, by the enhanced geocoding module on the display device, a graphical map comprising the at least one of the plurality of physical addresses; and the memory further storing the enhanced disposition monitoring module that, when executed by the hardware module, causes the geocoding mobile device to perform steps comprising:

receiving sales disposition information;

storing, using the enhanced disposition monitoring module, the sales disposition information in a data store;

generating, using the enhanced disposition monitoring module, a message comprising information about the plurality of physical addresses corresponding to the plurality of coordinate points; and generating, using the enhanced disposition monitoring module, a model based on at least the collected sales disposition, the model including a time of day at which an in-person sale attempt is most likely to be successful.

2. The geocoding mobile device of claim 1, wherein the enhanced geocoding module, when executed by the hardware module, causes the hardware module to: display a map comprising the additional information about at least one of the plurality of physical addresses.

3. The geocoding mobile device of claim 1, wherein the predetermined granularity is based on at least one of: population density, zoom level of a geographical area covered by the grid, average spacing value, a spacing that includes 81 coordinate points on the grid, and a rectangular grid shape.

4. The geocoding mobile device of claim 1, wherein additional information comprises color codes to represent a status of the at least one of the plurality of physical addresses as a current customer, a potential customer, and former customer, the geocoding mobile device further comprising:

an enhanced disposition monitoring module;

a processor; and a tangible computer memory storing computer-executable instructions that, when executed by the processor, cause the geocoding mobile device to perform steps comprising:

receiving sales disposition information;

storing, using the enhanced disposition monitoring module, the sales disposition information in a data store;

generating, using the enhanced disposition monitoring module, a message comprising information about the plurality of physical addresses corresponding to the plurality of coordinate points; and generating, using the enhanced disposition monitoring module, a model based on at least the collected sales disposition, the model including a time of day at which an in-person sale attempt is most likely to be successful.

5. One or more non-transitory computer-readable storage mediums having an enhanced geocoding module stored thereon that, when executed by a processor of a mobile tablet, causes the mobile tablet to perform steps comprising:

detecting, by a location tracking system embedded in the mobile tablet, a current location of the mobile tablet;

generating a grid in a memory of the mobile tablet that has a plurality of coordinate points arranged in a rectangular grid shape around the current location;

sending the current location and the plurality of coordinate points to a reverse geocoding server;

receiving, from the reverse geocoding server, a plurality of physical addresses corresponding to the plurality of coordinate points and the current location;

storing in a list in the memory of the mobile tablet, those of the plurality of physical addresses corresponding to the plurality of coordinate points that are on a same thoroughfare as the current location;

sorting the stored list of physical addresses in order of closest in distance from the current location;

displaying, on a display device of the mobile tablet, the stored list of sorted physical addresses; and displaying, on the display device, in association with the stored list of sorted physical addresses, additional information about at least one of the physical addresses in the stored list.

6. The computer-readable storage medium of claim 5, wherein a predetermined granularity of the grid is based on at least one of: population density, zoom level of a geographical area covered by the grid, average spacing value, a spacing that includes 81 coordinate points on the grid, and a rectangular grid shape.

7. The computer-readable storage medium of claim 5, wherein the reverse geocoding server receives the plurality of coordinate points as a batch request for a plurality of physical addresses corresponding to the plurality of coordinate points.

8. The computer-readable storage medium of claim 5, wherein the additional information about the at least one of the physical addresses in the stored list includes statistical information about a status of a customer at the at least one of the physical addresses.

9. The computer-readable storage medium of claim 5, wherein the processor further performs:

displaying, on the display device, a graphical map comprising the physical addresses in the stored list; and displaying on the graphical map an icon indicating a status of at least one of the plurality of physical addresses.

10. The computer-readable storage medium of claim 5, wherein the stored list of physical addresses is further sorted alphabetically based on street name.

11. The computer-readable storage medium of claim 5, wherein the processor further performs: displaying on a graphical map the plurality of physical addresses corresponding to the coordinate points of the grid.

12. The computer-readable storage medium of claim 5, wherein the processor further performs: displaying a plurality of statistics related to a traveling salesperson operating the mobile tablet.

13. The computer-readable storage medium of claim 12, wherein the plurality of statistics includes a number of customer sign-ups attributed to the traveling salesperson.

14. The computer-readable storage medium of claim 12, wherein the plurality of statistics includes a number of hours spent by a traveling salesperson to sign customers.

15. A method comprising:
   detecting, by a location tracking system embedded in a mobile tablet storing an enhanced geocoding module, a current location of the mobile tablet;
   recording, by a processor of the mobile tablet, the current location in a memory of the mobile tablet;
   generating, by the enhanced geocoding module executing on the processor of the mobile tablet, a grid in the memory that has the current location positioned in an interior of the grid, wherein the grid comprises a plurality of coordinate points around the current location;
   sending to a reverse geocoding server, by the mobile tablet, the current location and the plurality of coordinate points;
   receiving from the reverse geocoding server, by the mobile tablet, a plurality of physical addresses corresponding to the plurality of coordinate points and the current location;
   ranking more than one of the plurality of physical addresses corresponding to the plurality of coordinate points, by the enhanced geocoding module executing on the processor of the mobile tablet, such that the more than one physical addresses on one or more same thoroughfares as the current location are positioned at a top of a list stored in the memory in order of closest in distance from the current location;
   displaying, on a display device by the enhanced geocoding module executing on the processor of the mobile tablet, the more than one of the plurality of physical addresses in the list stored in the memory; and
   displaying, on the display device by the enhanced geocoding module executing on the processor of the mobile tablet, in association with the more than one of the plurality of physical addresses in the list, additional information about the more than one of the plurality of physical addresses.

16. The method of claim 15, wherein a predetermined granularity of the plurality of coordinate points on the grid is based on at least one of: population density, zoom level of a geographical area covered by the grid, and average spacing value.

17. The method of claim 15, wherein a spacing of the plurality of coordinate points on the grid is based on at least one of: a granularity that includes 81 coordinate points on the grid, and a rectangular grid shape.

18. The method of claim 15, wherein the additional information displayed on the display device is a plurality of statistics related to traveling salespersons' previous visits to the more than one of the plurality of physical addresses.

19. The method of claim 15, wherein the current location of the mobile tablet is positioned at a center of the grid stored in the memory.

20. The method of claim 15, further comprising: displaying, on the display device by the enhanced geocoding module executing on the processor of the mobile tablet, a map comprising the more than one of the plurality of physical addresses.

* * * * *